(12) United States Patent
Fujiwara

(10) Patent No.: US 10,500,667 B2
(45) Date of Patent: *Dec. 10, 2019

(54) ARC WELDING METHOD AND ARC WELDING APPARATUS FOR ADJUSTING A WELDING CURRENT WAVEFORM RESPONSIVE TO A SETTING VOLTAGE ADJUSTMENT

(75) Inventor: Junji Fujiwara, Osaka (JP)

(73) Assignee: Panasonic Intellectual Property Management Co., Ltd. (JP)

( * ) Notice: Subject to any disclaimer, the term of this patent is extended or adjusted under 35 U.S.C. 154(b) by 1225 days.

This patent is subject to a terminal disclaimer.

(21) Appl. No.: 12/993,889

(22) PCT Filed: Apr. 2, 2010

(86) PCT No.: PCT/JP2010/002436
§ 371 (c)(1),
(2), (4) Date: Nov. 22, 2010

(87) PCT Pub. No.: WO2010/116695
PCT Pub. Date: Oct. 14, 2010

(65) Prior Publication Data
US 2011/0248012 A1    Oct. 13, 2011

(30) Foreign Application Priority Data

Apr. 8, 2009 (JP) .................................. 2009-093826

(51) Int. Cl.
*B23K 9/09* (2006.01)
*B23K 9/10* (2006.01)

(52) U.S. Cl.
CPC ............ *B23K 9/092* (2013.01); *B23K 9/1012* (2013.01)

(58) Field of Classification Search
CPC .......... B23K 9/09; B23K 9/173; B23K 9/125; B23K 9/1093; B23K 9/1087; B23K 9/124;
(Continued)

(56) References Cited

U.S. PATENT DOCUMENTS 1,687,492 A * 10/1928 Churchward ................. 315/305
2,620,465 A    12/1952 Giroz
(Continued)

FOREIGN PATENT DOCUMENTS

DE    3213278 A1    11/1982
DE    60126390 T2    12/2007
(Continued)

OTHER PUBLICATIONS

International Search Report for International Application No. PCT/JP2010/002436, dated Jun. 29, 2010, Panasonic Corporation.
(Continued)

*Primary Examiner* — Eric S Stapleton
(74) *Attorney, Agent, or Firm* — RatnerPrestia

(57) ABSTRACT

A consumable electrode arc welding method includes: setting an optimal voltage and an increasing slope of a short circuit current to correspond to a setting current; feeding a consumable electrode wire; and alternately generating a short circuit condition and an arc condition, thereby carrying out welding, wherein the short circuit current is controlled by changing the increasing slope of the short circuit current according to a difference between the setting voltage and the optimal voltage when the setting voltage is different from the optimal voltage. With this, the increasing slope of the short circuit current and the current value corresponding to the inflection point of the short circuit current are automatically changed.

16 Claims, 9 Drawing Sheets

(58) Field of Classification Search
CPC ...... B23K 9/295; B23K 9/1081; B23K 9/092;
B23K 9/1012
USPC .................. 219/137 PS, 130.01–130.51
See application file for complete search history.

(56) References Cited

U.S. PATENT DOCUMENTS

| | | | |
|---|---|---|---|
| 3,291,960 A | 12/1966 | Folkhard et al. | |
| 3,459,920 A * | 8/1969 | Sevenco | 219/130.21 |
| 3,603,846 A * | 9/1971 | Toth | 361/187 |
| 3,622,744 A * | 11/1971 | Main et al. | 219/130.51 |
| 3,792,225 A | 2/1974 | Needham et al. | |
| 3,826,890 A * | 7/1974 | Bartlett | 219/130.5 |
| 3,928,746 A | 12/1975 | Ericsson | |
| 3,961,154 A | 6/1976 | Ericsson | |
| RE29,400 E | 9/1977 | Ericsson | |
| 4,046,987 A * | 9/1977 | Hashimoto et al. | 219/130.32 |
| RE29,441 E | 10/1977 | Ericsson | |
| 4,247,752 A * | 1/1981 | Stringer | 219/130.33 |
| 4,300,035 A * | 11/1981 | Johansson | 219/130.21 |
| 4,301,355 A * | 11/1981 | Kimbrough et al. | 219/137 PS |
| 4,310,744 A * | 1/1982 | Okada | 219/130.51 |
| 4,322,602 A * | 3/1982 | Grist | 219/130.33 |
| 4,384,187 A * | 5/1983 | Jackson et al. | 219/130.51 |
| 4,384,188 A * | 5/1983 | Wright, Jr. | 219/130.51 |
| 4,403,135 A * | 9/1983 | Moyer et al. | 219/137 PS |
| 4,418,267 A * | 11/1983 | Pfanzelt | 219/147 |
| 4,438,317 A * | 3/1984 | Ueguri et al. | 219/130.51 |
| 4,450,340 A * | 5/1984 | Corrigall et al. | 219/132 |
| 4,459,459 A * | 7/1984 | Overman | 219/130.51 |
| 4,469,933 A * | 9/1984 | Mizuno et al. | 219/130.21 |
| 4,479,046 A * | 10/1984 | Mizuno et al. | 219/130.32 |
| 4,485,293 A * | 11/1984 | Tabata et al. | 219/130.31 |
| 4,486,646 A * | 12/1984 | Frazier | 219/130.1 |
| 4,492,841 A * | 1/1985 | Delius | 219/69.1 |
| 4,493,040 A * | 1/1985 | Vanderhelst | 700/212 |
| 4,499,363 A * | 2/1985 | Izume et al. | 219/130.21 |
| 4,503,316 A * | 3/1985 | Murase et al. | 219/130.32 |
| 4,518,844 A * | 5/1985 | Needham | 219/137 PS |
| 4,521,672 A * | 6/1985 | Fronius | 219/130.33 |
| 4,523,077 A * | 6/1985 | Hoyt et al. | 219/137 PS |
| 4,544,826 A * | 10/1985 | Nakanishi et al. | 219/137 PS |
| 4,546,234 A * | 10/1985 | Ogasawara et al. | 219/137 PS |
| 4,553,018 A * | 11/1985 | Kondo et al. | 219/130.51 |
| 4,560,857 A * | 12/1985 | Segawa et al. | 219/130.21 |
| 4,575,604 A * | 3/1986 | Delius | 219/69.1 |
| 4,595,820 A * | 6/1986 | Richardson | 219/137 PS |
| 4,605,836 A * | 8/1986 | Retfalvi et al. | 219/130.01 |
| 4,697,062 A * | 9/1987 | Awano et al. | 219/130.51 |
| 4,716,273 A * | 12/1987 | Paton et al. | 219/130.1 |
| 4,717,807 A * | 1/1988 | Parks et al. | 219/130.21 |
| 4,758,707 A * | 7/1988 | Ogilvie et al. | 219/130.51 |
| 4,769,754 A * | 9/1988 | Reynolds et al. | 363/71 |
| 4,794,232 A * | 12/1988 | Kimbrough et al. | 219/130.51 |
| 4,797,529 A * | 1/1989 | Schmitt et al. | 219/99 |
| 4,835,360 A * | 5/1989 | Parks et al. | 219/137 PS |
| 4,866,247 A * | 9/1989 | Parks et al. | 219/137 PS |
| 4,877,941 A * | 10/1989 | Honma et al. | 219/130.21 |
| 4,943,702 A * | 7/1990 | Richardson | 219/124.34 |
| RE33,330 E * | 9/1990 | Ogasawara et al. | 219/137 PS |
| 4,954,691 A * | 9/1990 | Parks et al. | 219/137 PS |
| 4,963,715 A * | 10/1990 | Tuttle | 219/130.4 |
| 4,994,646 A * | 2/1991 | Tabata et al. | 219/130.51 |
| 4,996,409 A * | 2/1991 | Paton et al. | 219/130.01 |
| 5,001,326 A * | 3/1991 | Stava | 219/137 PS |
| 5,003,154 A * | 3/1991 | Parks et al. | 219/137 PS |
| 5,017,757 A * | 5/1991 | Kawai et al. | 219/130.51 |
| 5,043,557 A * | 8/1991 | Tabata et al. | 219/130.51 |
| 5,061,841 A * | 10/1991 | Richardson | 219/130.01 |
| 5,063,282 A | 11/1991 | Gilliland | |
| 5,157,236 A * | 10/1992 | Batzler et al. | 219/130.51 |
| 5,220,151 A * | 6/1993 | Terayama et al. | 219/130.32 |
| 5,250,786 A * | 10/1993 | Kikuchi et al. | 219/130.32 |
| 5,270,516 A * | 12/1993 | Hamamoto et al. | 219/130.33 |
| 5,278,390 A * | 1/1994 | Blankenship | 219/130.5 |
| 5,281,791 A * | 1/1994 | Tabata et al. | 219/130.51 |
| 5,369,243 A | 11/1994 | Kramer et al. | |
| 5,406,052 A * | 4/1995 | Mizuno et al. | 219/130.51 |
| 5,495,091 A * | 2/1996 | Tabata et al. | 219/130.51 |
| 5,570,254 A * | 10/1996 | Spilger et al. | 361/18 |
| 5,637,246 A * | 6/1997 | Ikegami et al. | 219/130.33 |
| 5,676,867 A * | 10/1997 | Van Allen | 219/130.1 |
| 5,683,602 A * | 11/1997 | Stava | 219/137 PS |
| 5,708,254 A * | 1/1998 | Ikegami et al. | 219/133 |
| 5,726,419 A * | 3/1998 | Tabata et al. | 219/130.51 |
| 5,734,147 A * | 3/1998 | Bunker et al. | 219/130.33 |
| 5,783,799 A * | 7/1998 | Geissler | 219/137 PS |
| 5,834,732 A * | 11/1998 | Innami et al. | 219/130.51 |
| 5,856,920 A * | 1/1999 | Buda et al. | 363/149 |
| 5,866,873 A * | 2/1999 | Wang et al. | 219/130.51 |
| 5,938,945 A * | 8/1999 | Hofmann et al. | 219/99 |
| 5,963,022 A * | 10/1999 | Buda et al. | 323/212 |
| 6,005,220 A * | 12/1999 | Bunker et al. | 219/130.33 |
| 6,015,964 A * | 1/2000 | Baker | 219/130.33 |
| 6,051,807 A * | 4/2000 | Ogasawara et al. | 219/130.51 |
| 6,087,626 A * | 7/2000 | Hutchison et al. | 219/130.21 |
| 6,087,627 A * | 7/2000 | Kramer | 219/130.21 |
| 6,107,602 A * | 8/2000 | Geissler et al. | 219/130.31 |
| 6,111,215 A * | 8/2000 | Lilly | 219/130.51 |
| 6,111,216 A * | 8/2000 | Stava | 219/130.51 |
| 6,156,998 A * | 12/2000 | Takahashi et al. | 219/130.21 |
| 6,201,216 B1 * | 3/2001 | Mumaw | 219/124.34 |
| 6,211,489 B1 * | 4/2001 | Kuchuk-Yatsenko et al. | 219/123 |
| 6,248,976 B1 * | 6/2001 | Blankenship | 219/130.21 |
| 6,274,845 B1 * | 8/2001 | Stava et al. | 219/125.12 |
| 6,326,591 B1 | 12/2001 | Hutchinson et al. | |
| 6,388,232 B1 * | 5/2002 | Samodell et al. | 219/130.33 |
| 6,407,364 B1 * | 6/2002 | Mumaw | 219/125.12 |
| 6,429,404 B1 * | 8/2002 | Suzuki | 219/124.34 |
| 6,441,342 B1 | 8/2002 | Hsu | |
| 6,472,634 B1 * | 10/2002 | Houston et al. | 219/130.5 |
| 6,501,049 B2 * | 12/2002 | Stava | 219/137 PS |
| 6,548,784 B2 * | 4/2003 | Sammons et al. | 219/132 |
| 6,570,130 B1 * | 5/2003 | Kooken et al. | 219/130.21 |
| 6,570,131 B1 * | 5/2003 | Stava | 219/130.4 |
| 6,621,049 B2 * | 9/2003 | Suzuki | 219/130.01 |
| 6,653,595 B2 | 11/2003 | Hutchison et al. | |
| 6,657,163 B1 * | 12/2003 | Blankenship et al. | 219/137.71 |
| 6,660,966 B2 * | 12/2003 | Houston et al. | 219/130.5 |
| 6,730,875 B2 * | 5/2004 | Hsu | 219/137 PS |
| 6,770,846 B2 * | 8/2004 | DeCoster | 219/130.21 |
| 6,794,608 B2 * | 9/2004 | Flood et al. | 219/130.51 |
| 6,800,832 B2 | 10/2004 | Hutchison et al. | |
| 6,809,293 B2 * | 10/2004 | Sammons et al. | 219/132 |
| 6,833,529 B2 | 12/2004 | Ueyama et al. | |
| 6,847,008 B2 * | 1/2005 | Myers et al. | 219/130.51 |
| 6,855,912 B2 * | 2/2005 | Houston et al. | 219/130.5 |
| 6,909,067 B2 * | 6/2005 | Davidson et al. | 219/130.51 |
| 6,930,279 B2 * | 8/2005 | Myers et al. | 219/130.51 |
| 6,930,280 B2 * | 8/2005 | Zauner et al. | 219/132 |
| 6,940,040 B2 * | 9/2005 | Houston et al. | 219/130.51 |
| 6,943,318 B2 * | 9/2005 | Takagi et al. | 219/137.61 |
| 6,987,243 B2 | 1/2006 | Hutchison et al. | |
| 7,053,334 B2 * | 5/2006 | Stava | 219/130.51 |
| 7,064,290 B2 * | 6/2006 | Blankenship et al. | 219/130.51 |
| 7,067,767 B2 | 6/2006 | Hsu | |
| 7,091,445 B2 * | 8/2006 | Myers et al. | 219/130.32 |
| 7,091,446 B2 * | 8/2006 | Houston et al. | 219/130.51 |
| 7,105,772 B2 * | 9/2006 | Houston et al. | 219/130.51 |
| 7,105,773 B2 * | 9/2006 | Myers et al. | 219/130.51 |
| 7,109,439 B2 * | 9/2006 | Stava | 219/130.51 |
| 7,148,449 B2 * | 12/2006 | Myers et al. | 219/130.51 |
| 7,166,817 B2 * | 1/2007 | Stava et al. | 219/130.5 |
| 7,173,214 B2 * | 2/2007 | Nadzam et al. | 219/130.51 |
| 7,183,517 B2 * | 2/2007 | Albrecht et al. | 219/130.4 |
| 7,217,904 B2 * | 5/2007 | Blankenship et al. | 219/130.33 |
| 7,265,320 B2 * | 9/2007 | Ou | 219/137 PS |
| 7,271,365 B2 * | 9/2007 | Stava et al. | 219/130.51 |
| 7,274,000 B2 * | 9/2007 | Dodge et al. | 219/130.1 |
| 7,282,668 B2 * | 10/2007 | Houston et al. | 219/130.51 |
| 7,304,269 B2 * | 12/2007 | Fulmer et al. | 219/130.51 |
| 7,358,459 B2 * | 4/2008 | Stava | 219/130.51 |
| 7,411,156 B2 * | 8/2008 | Myers et al. | 219/130.51 |

(56) References Cited

U.S. PATENT DOCUMENTS

| | | | |
|---|---|---|---|
| 7,495,193 B2* | 2/2009 | Myers et al. | 219/130.51 |
| 7,598,474 B2 | 10/2009 | Hutchison et al. | |
| 7,598,475 B2 | 10/2009 | Kawamoto et al. | |
| 7,820,943 B2 | 10/2010 | Beistle et al. | |
| 7,919,728 B2 | 4/2011 | Era | |
| 8,049,140 B2* | 11/2011 | Kawamoto et al. | 219/137 PS |
| 8,076,611 B2* | 12/2011 | Kawamoto et al. | 219/125.1 |
| 8,203,099 B2 | 6/2012 | Peters et al. | |
| 8,274,012 B2* | 9/2012 | Yamazaki et al. | 219/130.51 |
| 8,283,598 B2 | 10/2012 | Fulmer et al. | |
| 2002/0088786 A1* | 7/2002 | Rouault | 219/130.01 |
| 2002/0125235 A1* | 9/2002 | Stava | 219/130.33 |
| 2002/0144989 A1* | 10/2002 | Sammons et al. | 219/137 PS |
| 2002/0170899 A1* | 11/2002 | Suzuki | 219/130.01 |
| 2003/0006222 A1* | 1/2003 | Houston et al. | 219/130.51 |
| 2003/0066823 A1* | 4/2003 | DeCoster | 219/132 |
| 2003/0071024 A1* | 4/2003 | Hsu | 219/130.01 |
| 2003/0080101 A1* | 5/2003 | Flood et al. | 219/130.1 |
| 2003/0155338 A1* | 8/2003 | Sammons et al. | 219/130.21 |
| 2004/0065650 A1* | 4/2004 | Houston et al. | 219/130.51 |
| 2004/0079740 A1* | 4/2004 | Myers et al. | 219/130.51 |
| 2004/0140302 A1* | 7/2004 | Myers et al. | 219/130.51 |
| 2004/0232129 A1* | 11/2004 | Houston et al. | 219/130.51 |
| 2005/0006367 A1* | 1/2005 | Dodge et al. | 219/130.1 |
| 2005/0016974 A1* | 1/2005 | Myers et al. | 219/130.51 |
| 2005/0051524 A1* | 3/2005 | Blankenship et al. | 219/130.51 |
| 2005/0092726 A1* | 5/2005 | Myers et al. | 219/130.51 |
| 2005/0109748 A1* | 5/2005 | Albrecht et al. | 219/130.1 |
| 2005/0127054 A1* | 6/2005 | Houston et al. | 219/130.51 |
| 2005/0184039 A1* | 8/2005 | Stava | 219/130.51 |
| 2005/0189334 A1* | 9/2005 | Stava | 219/130.51 |
| 2005/0224481 A1* | 10/2005 | Nadzam et al. | 219/130.51 |
| 2005/0242076 A1* | 11/2005 | Stava et al. | 219/130.5 |
| 2006/0037952 A1* | 2/2006 | Myers et al. | 219/130.51 |
| 2006/0060574 A1* | 3/2006 | Blankenship et al. | 219/130.21 |
| 2006/0070983 A1* | 4/2006 | Narayanan et al. | 219/130.51 |
| 2006/0138116 A1* | 6/2006 | Lipnevicius | 219/137.71 |
| 2006/0169684 A1* | 8/2006 | Stava | 219/130.51 |
| 2006/0175313 A1* | 8/2006 | Kooken et al. | 219/130.1 |
| 2006/0201922 A1* | 9/2006 | Era et al. | 219/130.51 |
| 2006/0207983 A1* | 9/2006 | Myers et al. | 219/137 PS |
| 2006/0226131 A1* | 10/2006 | Stava et al. | 219/130.33 |
| 2006/0249497 A1* | 11/2006 | Myers et al. | 219/130.5 |
| 2006/0273075 A1* | 12/2006 | Samodell | 219/130.4 |
| 2006/0273076 A1* | 12/2006 | Houston et al. | 219/130.51 |
| 2007/0007265 A1* | 1/2007 | Myers et al. | 219/137 PS |
| 2007/0034618 A1* | 2/2007 | Myers et al. | 219/130.51 |
| 2007/0051714 A1* | 3/2007 | Ou | 219/130.21 |
| 2007/0102406 A1* | 5/2007 | Stava et al. | 219/130.5 |
| 2007/0187376 A1* | 8/2007 | Albrecht et al. | 219/130.1 |
| 2007/0221642 A1 | 9/2007 | Era | |
| 2007/0267393 A1* | 11/2007 | Dodge et al. | 219/130.1 |
| 2008/0006612 A1 | 1/2008 | Peters et al. | |
| 2008/0083705 A1* | 4/2008 | Peters | 219/61 |
| 2008/0087654 A1 | 4/2008 | Fulmer et al. | |
| 2008/0264916 A1* | 10/2008 | Nagano et al. | 219/130.33 |
| 2009/0008368 A1* | 1/2009 | Beeson et al. | 219/121.39 |
| 2010/0126976 A1* | 5/2010 | Kawamoto et al. | 219/125.1 |
| 2011/0132878 A1* | 6/2011 | Wang et al. | 219/74 |
| 2012/0074114 A1* | 3/2012 | Kawamoto et al. | 219/130.21 |
| 2012/0097654 A1* | 4/2012 | Kawamoto et al. | 219/125.1 |
| 2012/0116585 A1* | 5/2012 | Yoshima | 700/248 |
| 2012/0145690 A1* | 6/2012 | Kawamoto et al. | 219/130.5 |
| 2012/0199567 A1* | 8/2012 | Nakagawa et al. | 219/137 R |
| 2012/0255940 A1* | 10/2012 | Fujiwara et al. | 219/137 R |
| 2013/0001209 A1* | 1/2013 | Hirota et al. | 219/130.01 |

FOREIGN PATENT DOCUMENTS

| | | |
|---|---|---|
| EP | 0133448 B1 | 8/1989 |
| EP | 1182001 A1 | 2/2002 |
| EP | 1992440 | 11/2008 |
| JP | 59-199176 | 11/1984 |
| JP | 61-078568 | 4/1986 |
| JP | 03-281064 | 12/1991 |
| JP | 05-070549 B2 | 10/1993 |
| JP | 06-016944 B2 | 3/1994 |
| JP | 09-038773 | 2/1997 |
| JP | 2672173 B2 | 7/1997 |
| JP | 2006-247710 A | 9/2006 |
| JP | 4773044 A | 7/2011 |
| WO | WO 2006/112219 A1 | 10/2006 |

OTHER PUBLICATIONS

Office Action for U.S. Appl. No. 13/666,333, dated Apr. 3, 2015.

The Extended European Search Report dated Mar. 24, 2015 for the related European Patent Application No. 10761400.0.

European Notice of Opposition for Application No. 10761400.0, dated May 15, 2017, 6 pages.

Auszug aus: R. Killing, Handbuch der Schweißverfahren with partial English language translation, Teil I: Lichtbogenschweißverfahren, ISBN 3 87 155 087 6, Deutscher Verlag für Schweißtechnik (DVS), Dusseldorf 1984, 4 pages.

\* cited by examiner

ARC WELDING METHOD AND ARC WELDING APPARATUS FOR ADJUSTING A WELDING CURRENT WAVEFORM RESPONSIVE TO A SETTING VOLTAGE ADJUSTMENT

THIS APPLICATION IS A U.S. NATIONAL PHASE APPLICATION OF PCT INTERNATIONAL APPLICATION PCT/JP2010/002436.

TECHNICAL FIELD

The present invention relates to an arc welding method and an arc welding apparatus capable of welding by alternately generating a short circuit condition and an arc condition while feeding a welding wire as a consumable electrode.

BACKGROUND ART

In order to address disturbances such as variations in welding speed and length of wire extension, there has been conventionally known a technique of controlling a short circuit current during a short circuit period by changing a slope of a short circuit current and an inflection point of the short circuit current in a basic waveform of an optimal welding waveform.

For example, as shown in FIG. 9, there is known, in Patent Literature 1, an arc welding control method of welding an object to be welded by alternately repeating a short circuit period in which a short circuit is caused between a welding wire and the object to be welded and an arc period in which an arc is regenerated to cause an arc discharge that controls a slope of the basic waveform of the short circuit current by a two-step control. In FIG. 9, short circuit current It includes first tier slope J1 and second tier slope J2. Conventionally, second tier increasing slope J2 is adjusted to a "hard" K direction or a "soft" L direction from intermediate increasing slope J2 by adjusting a variable resistance of a slope adjuster knob. Further, by adjusting a current setter or an inflection point adjuster knob, short circuit current It at an inflection point between the first tier and the second tier is adjusted from intermediate point Ib to Ia greater than Ib or Ic smaller than Ib that are not shown in the drawing. Moreover, the welding current is freely controlled by a combination of these. Here, "soft" and "hard" respectively refer to a case in which a slope of short circuit current It of the basic waveform is small, and a case in which the slope of short circuit current It of the basic waveform is large.

By adjusting the slope adjuster knob of the short circuit current to "soft" and the inflection point adjuster knob to "large", it is possible to stabilize an arc and relatively reduce an amount of sputter generation, whereby stable wielding to a zinc-coated steel plate and such can be carried out. Further, by adjusting the slope adjuster knob of the short circuit current to "soft" and the inflection point adjuster knob to "small", it is possible to minimize the amount of sputter generation and to make suitable for high speed welding although susceptible to variations in wire extension. Moreover, by adjusting the slope adjuster knob of the short circuit current to "hard" and the inflection point adjuster knob to "large", it is possible to most stabilize the arc to the disturbance although the amount of sputter generation increases and beads are high.

As described above, according to the conventional technique, such an adjustment is carried out by an operator manipulating the knob for adjusting the second tier slope of the short circuit current and the knob for adjusting the inflection point of the short circuit current.

In recent years, in the welding industry, in order to improve productivity, there has been an increasing demand for increasing the welding speed and addressing the disturbances such as the variations in the length of wire extension and a gap between objects to be welded. Increasing the welding speed increases manufacturing quantity per hour and will not cause a flip of the welding wire even when the variations in the length of wire extension or the gap generation occur, and it is possible to weld without any bead defect, sputter increase, or burn-through due to arc instability. This provides advantageous effects of increasing a yield ratio of the object to be welded and reducing the number of correction steps.

Generally, as the number of short circuits is increased in case of increasing the welding speed, a setting voltage is often set to be smaller than a typical optimal voltage (hereinafter referred to as a unitary voltage) by a few V. As used herein, the unitary voltage is a voltage suitable for welding and corresponding to a setting current set by the operator. If the welding speed is high, a molten pool is less likely to be formed under the arc, as compared to a case in which the welding speed is low. Accordingly, the number of short circuits is increased in order to improve a following capability of the molten pool. However, as this by contrast reduces the arc period, a size of a droplet at a tip end of the welding wire becomes small, and it becomes harder to melt the welding wire in the next short circuit as well as to open the short circuit.

As a result, a problem has been noted that, in the worst-case scenario, the arc becomes instable to cause a wire flip as the welding wire is not completely molten, thereby causing problems such as the bead defect, sputter increase, and lack of penetration. Accordingly, the conventional technique described above addresses the above problems by adjusting the slope of the short circuit current and the inflection point of the short circuit current.

However, according to the conventional technique, the adjustment of the increasing slope of the short circuit current and the adjustment of the inflection point of the short circuit current have to be carried out by the welding operator manipulating the knob at the same time as the adjustment of the setting voltage, and there has been a problem that it is difficult for the operator to carry out such adjustments.

PRIOR ART DOCUMENT

Patent Literature

Patent Literature 1: Unexamined Japanese Patent Publication No. H09-38773

DISCLOSURE OF THE INVENTION

The present invention relates to provide an arc welding method and an arc welding apparatus capable of automatically adjusting an increasing slope of a short circuit current or an inflection point of the short circuit current at the same time when a setting voltage is adjusted without a welding operator manipulating a knob. The present invention also relates to provide an arc welding method and an arc welding apparatus capable of automatically controlling the short circuit current by changing a value of an initial short circuit current and time for an initial short circuit without the welding operator manipulating a knob.

An arc welding method according to the present invention is a consumable electrode arc welding method including: setting an optimal voltage and an increasing slope of a short circuit current to correspond to a setting current; feeding a consumable electrode wire; and alternately generating a short circuit condition and an arc condition, thereby carrying out welding, wherein when the setting voltage is different from the optimal voltage, the short circuit current is controlled by changing the increasing slope of the short circuit current according to a difference between the setting voltage and the optimal voltage.

Further, an arc welding method according to the present invention is a consumable electrode arc welding method including: setting an optimal voltage, an initial short circuit time that is a predetermined period of time from a start of a short circuit, and an initial short circuit current value that is a current supplied during the initial short circuit time to correspond to a setting current, feeding a consumable electrode wire; and alternately generating a short circuit condition and an arc condition, thereby carrying out welding, wherein when the setting voltage is different from the optimal voltage, the short circuit current is controlled by changing the initial short circuit current value and the initial short circuit time according to a difference between the setting voltage and the optimal voltage.

According to the above configurations, it is possible to automatically adjust the increasing slope of the short circuit current, the current value at the inflection point of the short circuit current, the initial short circuit current, or the initial short circuit time without needing the welding operator even when a setting voltage is set to be smaller than a typical optimal voltage by a few V so as to address disturbances such as an increased welding speed, variations in a length of wire extension, and a gap between objects to be welded.

With this, by accelerating melting of the welding wire, it is possible to minimize problems such as a bead defect, a sputter increase, and a lack of penetration due to arc instability without causing a flip of the welding wire. Therefore, it is possible to improve the yield ratio of objects to be welded and reduce the number of correction steps, thereby improving a welding quality in high speed welding. Further, it is possible to suppress harmful influences on production efficiency and a work environment.

PREFERRED EMBODIMENTS FOR CARRYING OUT OF THE INVENTION

The following describes an arc welding method and an arc welding apparatus of a consumable electrode type according to embodiments of the present invention with reference to the drawings. In the embodiments described below, an optimal voltage suitable for welding and corresponding to a setting current set by an operator is described as a unitary voltage, as described above.

(Embodiment 1)

In this embodiment, the arc welding method is first described and then the arc welding apparatus is described.

Figure 1:
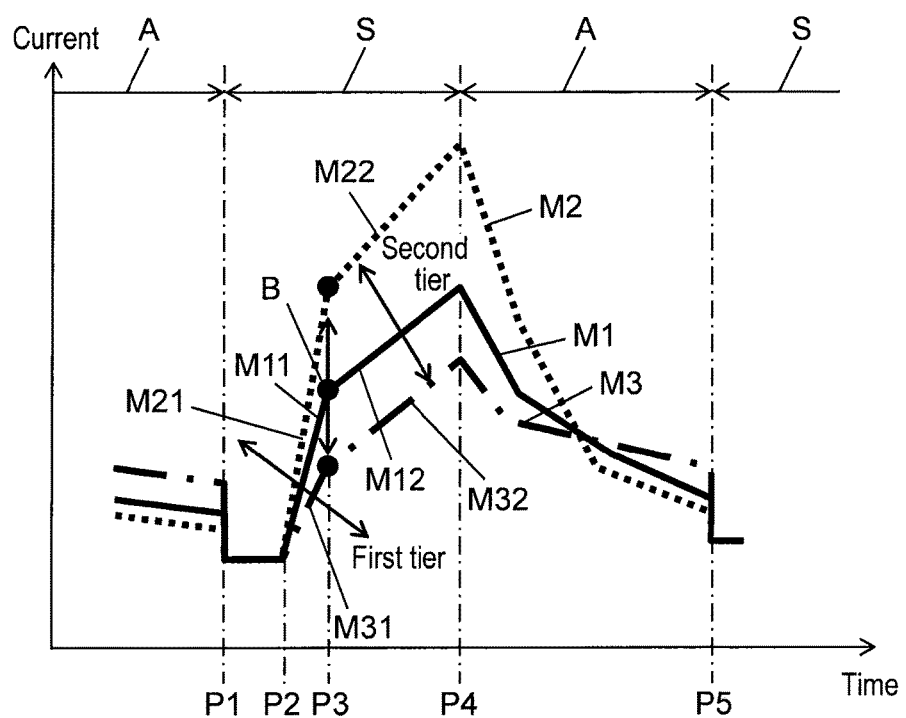
FIG. 1 is a chart showing a welding current waveform in an arc welding method according to embodiment 1 of the present invention.

FIG. 1 shows waveforms of a welding current in a consumable electrode arc welding in which a short circuit condition and an arc condition are alternately repeated. In FIG. 1, a period of time for the short circuit condition is represented by short circuit period S and a period of time for the arc condition is represented by arc period A.

With reference to FIG. 1, time P1 represents a time point at which the short circuit starts, which also is a time point at which an initial short circuit time starts. Time P2 represents a time point at which the initial short circuit time ends, which also is a time point at which an output of increasing slope di/dt of a short circuit current starts. Further, time P3 represents a time point indicating inflection point B (black circle point) between increasing slope di/dt in a first tier and increasing slope di/dt in a second tier of the short circuit current. Moreover, time P4 represents a time point at which the output of increasing slope di/dt of the short circuit current in the second tier ends, which also is a time point at which short circuit period S ends and an arc is generated. Further, time P5 represents a time point at which a subsequent short circuit is generated.

Moreover, FIG. 1 also shows a varied example of increasing slope di/dt of the short circuit current and inflection point B between increasing slope di/dt in the first tier of the short circuit current and increasing slope di/dt in the second tier of the short circuit current, when the setting voltage is increased or decreased from the unitary voltage.

In FIG. 1, a current waveform in which the setting voltage corresponds to the unitary voltage is represented by solid line M1. A current waveform when a voltage is decreased from the unitary voltage, that is, when the setting voltage is smaller than the unitary voltage, is represented by dotted line M2. A current waveform when a voltage is increased from the unitary voltage, that is, when the setting voltage is greater than the unitary voltage, is represented by alternate long and short dash line M3. Increasing slope di/dt of the short circuit current indicates an amount of variation in the short circuit current value per unit time.

First, a single cycle of the short circuit corresponding to a period of time from time P1 to time P5 shown in FIG. 1 is described below. At the time point of time P1, a welding wire is brought into contact with an object to be welded, thereby generating a short circuit. During the initial short circuit time from time P1 to time P2, an initial short circuit current that is lower than the current when the short circuit is generated is outputted.

Here, a purpose why the current in the initial short circuit time from time P1 to time P2 is set to be low is described. When the short circuit current is increased immediately after the short circuit is generated to set the current high, there is often a case in which the short circuit is opened immediately and then the short circuit is again generated immediately afterwards, thereby upsetting a cyclic nature of the short circuit. Accordingly, by providing a period of time in which a low current is outputted immediately after the short circuit is generated, it is possible to control such that a condition with a steady short circuit is first maintained and then the short circuit current is increased to a high current. It should be noted that the initial short circuit time and the initial short circuit current value are obtained and introduced as a result of verification by experiment and such. The initial short circuit time and the initial short circuit current value are stored in a memory unit that is not shown in the drawing in a form such as a table (for example, a data structure table in which parameters such as the initial short circuit time and the initial short circuit current value are associated with current values).

Next, at the time point of time P2, increasing slope di/dt in the first tier of the short circuit current is set in a condition in which the welding wire is steadily short-circuited to the object to be welded. Along increasing slope di/dt in the first tier of the short circuit current, an actual short circuit current increases. When the increased short circuit current reaches a current value of inflection point B of the short circuit current at the time point of time P3, the actual short circuit current increases along increasing slope di/dt in the second tier of the set short circuit current.

Here, increasing slope di/dt in the first tier of the short circuit current from time P2 to time P3, increasing slope di/dt in the second tier of the short circuit current from time P3 to time P4, and a base setting value of the current value corresponding to inflection point B of the short circuit current at time P3 are obtained and introduced as a result of verification by experiment as optimal values at which stable welding can be carried out when the welding is carried out at a certain welding speed (1 m/min in this embodiment) even if the voltage is varied more or less. The initial short circuit time and the initial short circuit current value are stored in a memory unit that is not shown in the drawing in a form such as a table or a mathematical expression (for example, data in which parameters such as the initial short circuit time and the initial short circuit current value are associated with current values is converted into a mathematical expression).

Next, when the short circuit is opened and the arc is generated at the time point of time P4, a welding current calculated in a constant voltage control is outputted, and this continues until the time point of time P5 at which a subsequent short circuit is generated. As described above, the welding is carried out by repeating this cycle taking the control from time P1 to time P5 as a single cycle.

Here, for increasing slope di/dt in the first tier of the short circuit current from time P2 to time P3, increasing slope di/dt in the second tier of the short circuit current from time P3 to time P4, and the current value corresponding to inflection point B of the short circuit current at the time point of time P3 obtained at the welding speed of 1 m/min as described above, conventionally, there is often a case in which, when the welding operator sets the welding speed to be 1.5 m/min and the setting voltage to be −5 V of the unitary voltage, for example, the welding wire is hard to melt at an optimal value at the welding speed of 1 m/min as a following capability of a molten pool is poor and it is difficult to open the short circuit for the welding wire from the object to be welded, thereby causing a state in which the arc is instable such as a wire flip.

Therefore, in this embodiment, when the setting voltage is set to be decreased from the unitary voltage, increasing slope di/dt in the first tier of the short circuit current from time P2 to time P3, increasing slope di/dt in the second tier of the short circuit current from time P3 to time P4, and the current value corresponding to inflection point B of the short circuit current at the time point of time P3 are automatically changed to increase according to a voltage difference value between the setting voltage and the unitary voltage.

As one example of the automatic change, the voltage difference value, increasing slopes di/dt in the first tier and in the second tier, and inflection point B can be associated and stored in a memory unit that is not shown in the drawing, and increasing slopes di/dt and inflection point B can be determined according to the voltage difference value. Further, it is possible to store a mathematical expression that associates the voltage difference value with increasing slopes di/dt and inflection point B in a memory unit that is not shown in the drawing, and to determine increasing slopes di/dt and inflection point B voltage according to the difference value.

In this embodiment, as can be seen from FIG. 1, when the setting voltage is smaller than the unitary voltage, the short circuit current is controlled to change such that increasing slope di/dt of the short circuit current becomes steeper than increasing slope di/dt of the short circuit current when the setting voltage is the same as the unitary voltage, and when the setting voltage is greater than the unitary voltage, such that increasing slope di/dt of the short circuit current becomes more moderate than increasing slope di/dt of the short circuit current when the setting voltage is the same as the unitary voltage.

Further, in this embodiment, as can be seen from FIG. 1, increasing slope di/dt in the first tier of the short circuit current and increasing slope di/dt in the second tier of the short circuit current are controlled to be different slopes. Moreover, in this embodiment, increasing slope di/dt in the first tier of the short circuit current is controlled to be steeper than increasing slope di/dt in the second tier of the short circuit current.

Figure 2:
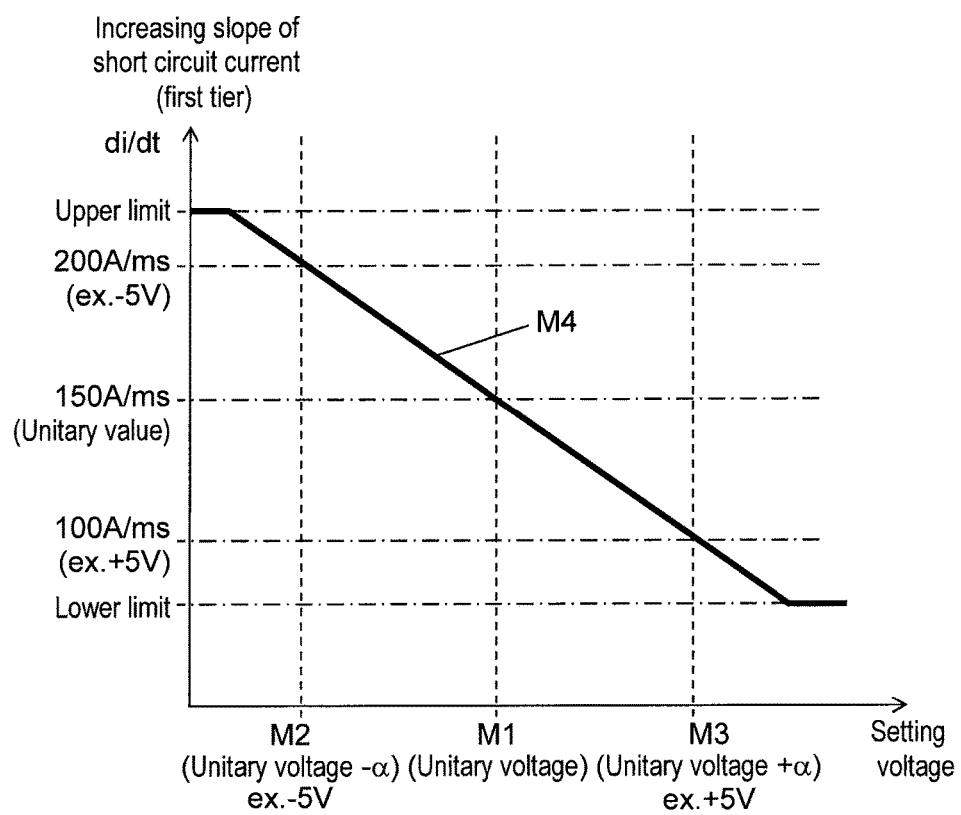
FIG. 2 is a chart showing a relation between a setting voltage and an increasing slope of a short circuit current in the arc welding method according to embodiment 1.

Next, an example of changing increasing slope di/dt of the short circuit current is described with reference to FIG. 2. FIG. 2 is a chart showing one example of a relation between the setting voltage and increasing slope di/dt in the first tier of the short circuit current. It should be noted that the relation between the setting voltage and increasing slope di/dt in the second tier of the short circuit current can be shown by a similar chart. Depending on the parameters, there are various types of increasing slope di/dt in the first tier and increasing slope di/dt in the second tier, and increasing slope di/dt in the first tier and increasing slope di/dt in the second tier can be the same or can be different. However, in most cases, the slope in the second tier is more moderate than that in the first tier. FIG. 1 shows a case in which the slope in the second tier is changed to be more moderate than that in the first tier.

For example, if the setting voltage set by the welding operator is the same as the unitary voltage, increasing slope di/dt in the first tier of the short circuit current is 150 A/ms as indicated by line M4 in FIG. 2. Increasing slope di/dt of the short circuit current at this time, that is, increasing slope di/dt of the short circuit current that corresponds to the unitary voltage is hereinafter referred to as a unitary value. The welding current waveform when increasing slope di/dt in the first tier of the short circuit current is 150 A/ms is represented by solid line M11 in FIG. 1. However, when the setting voltage is set to be −5 V of the unitary voltage, that is, when the setting voltage is set to be smaller than the unitary voltage by 5 V, increasing slope di/dt in the first tier of the short circuit current is 200 A/ms, adding 50 A/ms to the unitary value 150 A/ms. The welding current waveform when increasing slope di/dt in the first tier of the short circuit current is 200 A/ms is represented by dotted line M21 in FIG. 1. Further, when the setting voltage is set to be +5 V of the unitary voltage, that is, when the setting voltage is set to be greater than the unitary voltage by 5 V, increasing slope di/dt in the first tier of the short circuit current is 100 A/ms, subtracting 50 A/ms from the unitary value 150 A/ms. The welding current waveform when increasing slope di/dt in the first tier of the short circuit current is 100 A/ms is represented by alternate long and short dash line M31 in FIG. 1.

Regarding the change of increasing slopes di/dt of the short circuit current, it is possible to change increasing slopes di/dt by increasing or decreasing by the same value both in the first tier and the second tier, or it is possible to change separately. For example, it is possible to increase or decrease the slope only in the first tier, and to keep the slope in the second tier unchanged. Dotted line M2 represents a case in which increasing slopes di/dt are changed to a large extent both in the first tier in the second tier, and in which increasing slope di/dt in the second tier is more moderate than that in the first tier.

Further, FIG. 2 shows an example of an absolute value method in which the increasing slope of the short circuit current per ±1 V of a difference between the setting voltage and the unitary voltage is ±10 A/ms. Specifically, the example in which the change is carried out by an absolute amount that corresponds to the difference between the setting voltage and the unitary voltage is shown. However, it is possible to carry out the change by an amount based on a change rate according to the difference between the setting voltage and the unitary voltage. For example, it is possible to employ a variability method such as ±5% per ±1 V of the difference between the setting voltage and the unitary voltage.

Moreover, FIG. 2 shows an example in which the relation between the setting voltage and increasing slope di/dt of the short circuit current is a first order curve, but not limited to this, and a curve other than the first order curve such as a quadratic curve can be taken, for example.

Here, as the setting voltage is set to be decreased from the unitary voltage, the number of short circuits increases and arc period A is reduced, and as a result, a droplet at a tip end of the welding wire becomes smaller. Therefore, in the subsequent short circuit, the welding wire is hard to melt, and it is difficult to open the short circuit. However, if the setting voltage is set to be decreased from the unitary voltage by carrying out the control according to this embodiment, the change is carried out such that increasing slope di/dt of the short circuit current is increased. Accordingly, the melting of the welding wire can be accelerated, and it is possible to open the short circuit relatively smoothly.

Figure 3:
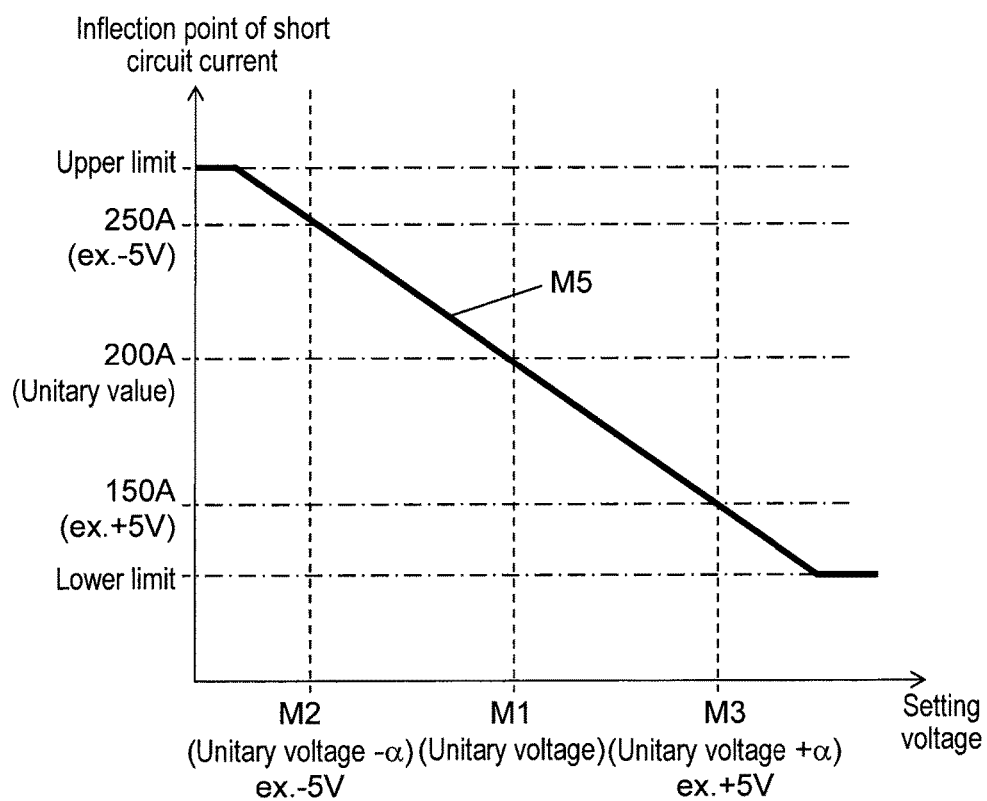
FIG. 3 is a chart showing a relation between the setting voltage and an inflection point of the short circuit current in the arc welding method according to embodiment 1.

Next, the change of inflection point B between increasing slope di/dt in the first tier of the short circuit current and increasing slope di/dt in the second tier of the short circuit current is described with reference to FIG. 3. FIG. 3 is a chart showing one example of a relation between the setting voltage and inflection point B of the short circuit current (an inflection current value of the short circuit current).

For example, the current value corresponding to inflection point B of the short circuit current is 200 A that is the unitary value, if the setting voltage set by the operator is the same as the unitary voltage, as indicated by line M5 in FIG. 3. However, when the setting voltage is set to be −5 V of the unitary voltage, that is, when the setting voltage is set to be smaller than the unitary voltage by 5 V, the current value corresponding to inflection point B of the short circuit current is 250 A, adding 50 A to the unitary value 200 A.

Although FIG. 3 shows the example of the absolute value method of ±10 A per ±1 V, the variability method of ±5% per ±1 V can also be employed. Specifically, similarly to the description of the change of increasing slope di/dt of the short circuit current, inflection point B can be changed by the absolute amount that corresponds to the difference between the setting voltage and the unitary voltage, or can be changed by the amount based on the change rate according to the difference between the setting voltage and the unitary voltage.

Further, in FIG. 3, the relation between the setting voltage and the inflection point of the short circuit current is represented by a first order curve, but can be a curve other than the first order curve such as a quadratic curve, for example.

Here, as the setting voltage is set to be decreased from the unitary voltage, the number of short circuits increases and the arc period is reduced. As a result, the droplet at the tip end of the welding wire becomes smaller. Therefore, in the subsequent short circuit, the welding wire is hard to melt, and it is difficult to open the short circuit. However, if the setting voltage is set to be decreased from the unitary voltage by carrying out the control according to this embodiment, the change is carried out such that the current value corresponding to inflection point B of the short circuit current is increased. Accordingly, the melting of the welding wire can be accelerated, and it is possible to open the short circuit relatively smoothly.

According to this embodiment, as shown in FIG. 2 and FIG. 3, when the setting voltage is set to be a value increased or decreased from the unitary voltage, increasing slope di/dt of the short circuit current from time P2 to time P3, increasing slope di/dt of the short circuit current from time P3 to time P4, and the current value corresponding to inflection point B of the short circuit current until the time point of time P3 are changed according to this setting. Specifically, this embodiment describes the case in which the increasing slope of the short circuit current is configured by increasing slope di/dt in the first tier of the short circuit current and increasing slope di/dt in the second tier of the short circuit current that follows increasing slope di/dt in the first tier of the short circuit current.

However, the present invention can also be applied to a consumable electrode arc welding method in which the increasing slope of the short circuit current is configured only by increasing slope di/dt in the first tier of the short circuit current, the unitary voltage corresponding to the setting current and the increasing slope of the short circuit current are set, and the consumable electrode wire is fed to alternately generate the short circuit condition and the arc condition, thereby carrying out the welding.

Further, according to this embodiment, as shown in FIG. 2 and FIG. 3, upper and lower limits are set for increasing slope di/dt of the short circuit current and the current value corresponding to inflection point B. This allows the prevention of excessive adjustment. Specifically, by setting the upper and lower limits, it is possible to prevent increasing slope di/dt of the short circuit current and inflection point B of the short circuit current from being increased too much, thereby preventing the sputter from increasing too much and the arc from becoming instable.

It should be noted that increasing slope di/dt in the first tier of the short circuit current from time P2 to time P3, increasing slope di/dt in the second tier of the short circuit current from time P3 to time P4, and the current value corresponding to inflection point B of the short circuit current at time P3 are set based on, in addition to the difference value between the setting voltage and the unitary voltage, at least one of a diameter of the consumable electrode wire, a type of the wire thereof, an extension length of the wire thereof, a shielding gas to be supplied, and a current setting range of the welding current.

As described above, by controlling the short circuit current by carrying out the automatic adjustment according to this embodiment, it is possible to melt the welding wire quickly after the generation of the short circuit. Therefore, even when the welding speed is high and the setting voltage is set to be decreased from the unitary voltage, it is possible to prevent the wire flip from occurring and the arc from becoming instable.

If the welding speed is as low as under 1 m/min and the setting voltage is set to be increased from the unitary voltage, increasing slope di/dt of the short circuit current from time P2 to time P3, increasing slope di/dt of the short circuit current from time P3 to time P4, and the current value corresponding to the inflection point of the short circuit current at time P3 are automatically adjusted to be decreased, and therefore it is possible to lower the short circuit open current, thereby providing an advantageous effect of sputter reduction.

Figure 4:
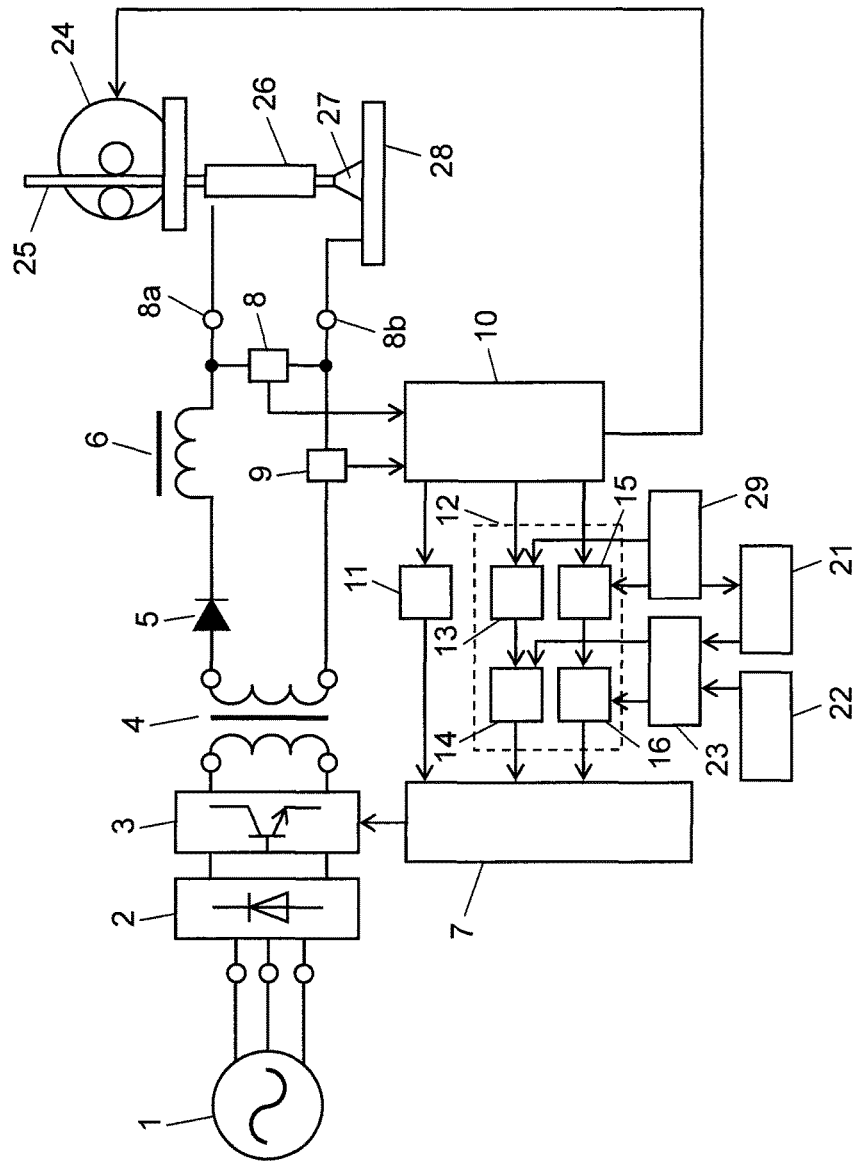
FIG. 4 is a schematic configurational view illustrating an arc welding apparatus according to embodiment 1.

Next, the arc welding apparatus that carries out the control according to this embodiment is described. FIG. 4 is a schematic configurational view illustrating the arc welding apparatus according to this embodiment, which is configured as described below.

According to the arc welding apparatus of this embodiment, power from input power source 1 is rectified by primary rectifier 2, converted into an alternate current by switching device 3, depressed by transformer 4, rectified by secondary rectifier 5 and inductor 6, and applied between welding wire 25 and object to be welded 28. Further, the arc welding apparatus according to this embodiment is provided with driving unit 7 for controlling switching device 3, welding voltage detecting unit 8 connected between power output terminals for welding 8a, 8b, welding current detecting unit 9 that detects a welding output current, and short circuit/arc detecting unit 10 that determines whether the short circuit or the arc is generated based on a signal from welding voltage detecting unit 8. Moreover, the arc welding apparatus according to this embodiment is provided with arc control unit 11 that controls the arc voltage during arc period A in response to an arc signal from short circuit/arc detecting unit 10, short circuit control unit 12 that controls the short circuit current during short circuit period S in response to a short circuit signal from short circuit/arc detecting unit 10, and setting current setting unit 29 for setting the setting current by the welding operator. Furthermore, the arc welding apparatus according to this embodiment is provided with unitary voltage setting unit 21 for setting the unitary voltage based on the setting current set to setting current setting unit 29 by the operator, setting voltage setting unit 22 for setting the setting voltage, and unitary/setting voltage difference calculation unit 23 for obtaining a difference between the unitary setting voltage set by unitary voltage setting unit 21 and the setting voltage set by setting voltage setting unit 22.

Short circuit control unit 12 is provided with basic setting unit 13 for increasing slope di/dt of the short circuit current that sets increasing slope di/dt in the first tier of the short circuit current and increasing slope di/dt in the second tier of the short circuit current based on the setting current set by setting current setting unit 29 by the operator. Further, there is provided control unit 14 for increasing slope di/dt of the short circuit current that changes increasing slope di/dt of the short circuit current that is set by basic setting unit 13 for increasing slope di/dt of the short circuit current based on a result of the calculation by unitary/setting voltage difference calculation unit 23. Moreover, short circuit control unit 12 is provided with basic setting unit 15 for the inflection point of the short circuit current that sets inflection point B at which the slope changes from increasing slope di/dt in the first tier of the short circuit current to increasing slope di/dt in the second tier of the short circuit current based on the setting current set by setting current setting unit 29 by the operator. Furthermore, there is provided control unit 16 for the inflection point of the short circuit current that changes the current value corresponding to inflection point B based on the result of the calculation by unitary/setting voltage difference calculation unit 23. It should be noted that the relation between the unitary voltage to the setting current and each of increasing slope di/dt in the first tier of the short circuit current, increasing slope di/dt in the second tier of the short circuit current, and inflection point B are stored in a memory unit that is not shown in the drawing in a form such as a table or a mathematical expression, for example, and determined based on the setting current.

Welding voltage detecting unit 8 is connected between power output terminals for welding 8a, 8b, and outputs a signal that corresponds to the detected voltage to short circuit/arc detecting unit 10. Short circuit/arc detecting unit 10 determines whether an output welding voltage is equal to or greater than a predetermined value or smaller than the predetermined value based on the signal from welding voltage detecting unit 8, determines whether welding wire 25 is in contact with and short-circuited to object to be welded 28 or the welding arc is generated in a non-contact state based on a result of the determination, and outputs a determination signal.

Next, the short circuit control of short circuit/arc detecting unit 10 after the determination is described. Short circuit control unit 12 is provided with, as described above, basic setting unit 13 for increasing slope di/dt of the short circuit current, control unit 14 for increasing slope di/dt of the short circuit current, basic setting unit 15 for the inflection point of the short circuit current, and control unit 16 for the inflection point of the short circuit current. The difference between unitary voltage setting unit 21 and setting voltage setting unit 22 is monitored by unitary/setting voltage difference calculation unit 23, and short circuit control unit 12 receives the voltage difference value from unitary/setting voltage difference calculation unit 23. Control unit 14 for increasing slope di/dt of the short circuit current and control unit 16 for the inflection point of the short circuit current output values changed from values from basic setting unit 13 for increasing slope di/dt of the short circuit current and basic setting unit 15 for the inflection point of the short circuit current to driving unit 7. With this, as described with reference to FIG. 1 to FIG. 3, increasing slope di/dt of the short circuit current and inflection point B of the short circuit current are controlled, thereby controlling the short circuit current.

With the arc welding apparatus described above, it is possible to minimize problems such as a bead defect, a sputter increase, and a lack of penetration due to an instable arc when the welding speed is high and the setting voltage is different from the unitary voltage by automatically adjusting increasing slope di/dt of the short circuit current and the current value corresponding to inflection point B of the short circuit current. Therefore, it is possible to suppress harmful influences on a production efficiency and a work environment.

The components that constitute the arc welding apparatus shown in FIG. 4 can be configured separately, or more than one components can be combined.

(Embodiment 2)

In this embodiment, like components are denoted by the same numerals as those used in embodiment 1 and will not be explained in detail. A main difference from embodiment 1 is that the initial short circuit current value and the initial short circuit time are changed when the setting voltage is different from the unitary voltage. However, according to the present invention, it is not necessary to change both of the initial short circuit current value and the initial short circuit time. Specifically, changing at least one of the initial short circuit current value and the initial short circuit time is sufficient. In this embodiment, a case in which the initial short circuit current value and the initial short circuit time are changed.

Figure 5:
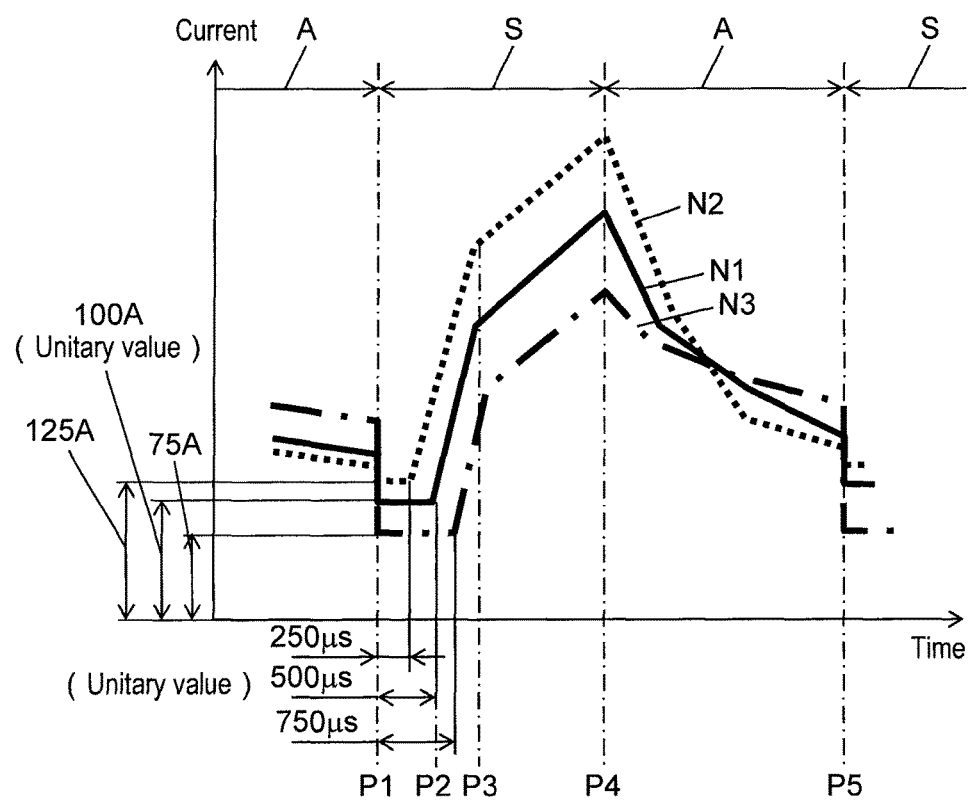
FIG. 5 is a chart showing a welding current waveform in the arc welding method according to embodiment 2 of the present invention.

FIG. 5 shows, similarly to embodiment 1, waveforms of the welding current in the consumable electrode arc welding in which the short circuit condition and the arc condition are alternately repeated. With reference to FIG. 5, the current waveform in which the setting voltage corresponds to the unitary voltage is represented by solid line N1. The current waveform when the voltage is decreased from the unitary voltage, that is, when the setting voltage is smaller than the unitary voltage, is represented by dotted line N2. The current waveform when the voltage is increased from the unitary voltage, that is, when the setting voltage is greater than the unitary voltage, is represented by alternate long and short dash line N3.

Similarly to embodiment 1, for the initial short circuit current value and the initial short circuit time from time P1 to time P2 when the welding speed is 1 m/min, conventionally, there is often a case in which, when the welding operator sets the welding speed to be 1.5 m/min and the setting voltage to be −5 V of the unitary voltage (smaller by 5 V), for example, the welding wire is hard to melt with an optimal value at the welding speed of 1 m/min as a following capability of a molten pool is poor and it is difficult to open the short circuit for the welding wire from the object to be welded, thereby causing a state in which the arc is instable such as a wire flip.

Therefore, in this embodiment, when the setting voltage is set to be decreased from the unitary voltage, that is, when the setting voltage is set to be smaller than the unitary voltage, the initial short circuit current value from time P1 to time P2 is changed to increase, that is, to be greater than the initial short circuit current value when the setting voltage is the same as the unitary voltage. Further, the initial short circuit time from time P1 to time P2 is changed to decrease, that is, to be shorter than the initial short circuit time when the setting voltage is the same as the unitary voltage.

Figure 6:
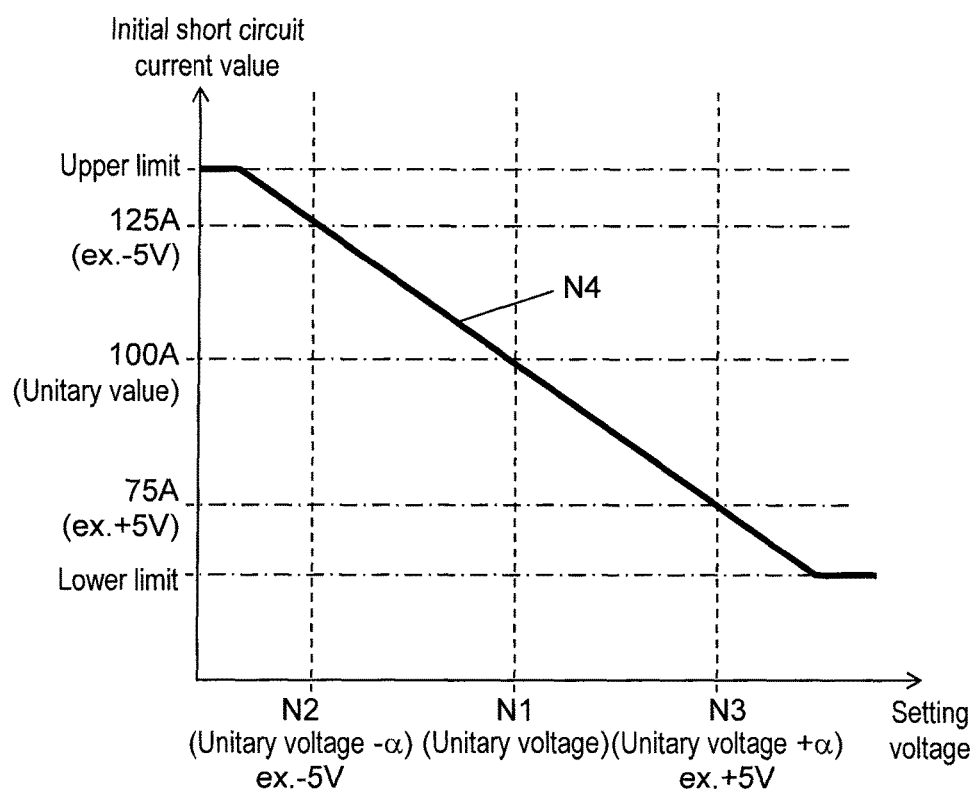
FIG. 6 is a chart showing a relation between the setting voltage and an initial short circuit current in the arc welding method according to embodiment 2.

Next, an example of changing the initial short circuit current value is now described with reference to FIG. 6. FIG. 6 is a chart showing one example of a relation between the setting voltage and the initial short circuit current value. For example, if the setting voltage set by the operator is the same as the unitary voltage, the initial short circuit current value is 100 A which is the unitary value as indicated by line N4 in FIG. 6. The welding current waveform at this time is represented by solid line N1 in FIG. 5. However, when the setting voltage is set to be −5 V of the unitary voltage, that is, when the setting voltage is set to be smaller than the unitary voltage by 5 V, the initial short circuit current value is 125 A, adding 25 A to the unitary value 100 A. The welding current waveform at this time is represented by dotted line N2 in FIG. 5. In contrast, when the setting voltage is set to be +5 V of the unitary voltage, that is, when the setting voltage is set to be greater than the unitary voltage by 5 V, as indicated by alternate long and short dash line N3, the initial short circuit current value is 75 A, subtracting 25 A from the unitary value 100 A. The welding current waveform at this time is represented by alternate long and short dash line N3 in FIG. 5.

Although FIG. 6 shows the example of the absolute value method of changing ±5 A per ±1 V, the variability method of changing ±5% per ±1 V can also be employed. Specifically, the initial short circuit current value can be changed by an absolute amount that corresponds to the difference between the optimal voltage and the setting voltage, or can be changed by an amount based on a change rate according to the difference between the optimal voltage and the setting voltage.

Further, in FIG. 6, the relation between the setting voltage and the initial short circuit current value is represented by a first order curve, but can be a curve other than the first order curve such as a quadratic curve, for example.

Here, as the setting voltage is set to be decreased from the unitary voltage, the number of short circuits increases and arc period A is reduced, and accordingly, a droplet at a tip end of the welding wire becomes smaller. As a result, in the subsequent short circuit, the welding wire is hard to melt, and it is difficult to open the short circuit. However, by changing the initial short circuit current value to be increased by carrying out the control according to this embodiment, the state in which the welding wire and the object to be welded are steadily short-circuited can be eased to some extent. With this, the melting of the welding wire can be accelerated, and it is possible to open the short circuit relatively smoothly.

Figure 7:
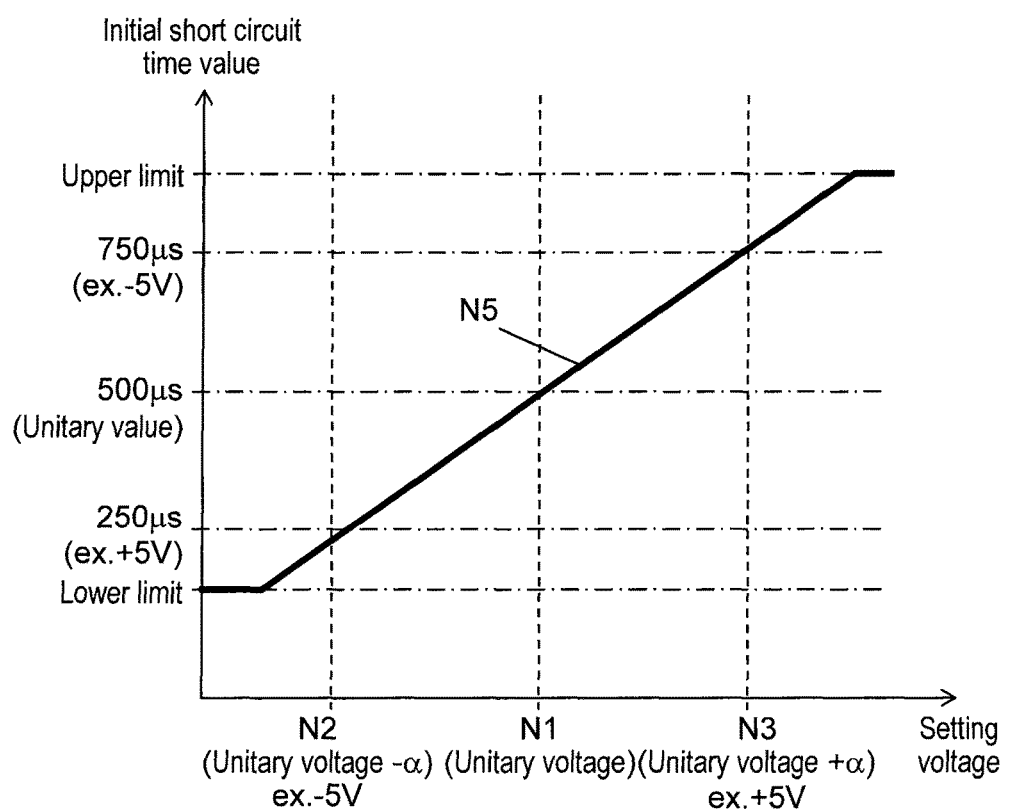
FIG. 7 is a chart showing a relation between the setting voltage and the initial short circuit time in the arc welding method according to embodiment 2.

Next, the control of the initial short circuit time is described with reference to FIG. 7. FIG. 7 is a chart showing one example of a relation between the setting voltage and the initial short circuit time value. For example, if the setting voltage set by the operator is the same as the unitary voltage, the initial short circuit time value is 500 μs which is the unitary value (see solid line N1 representing the welding current waveform in FIG. 5) as indicated by line N5 in FIG. 7. However, when the setting voltage is set to be −5 V of the unitary voltage, that is, when the setting voltage is set to be smaller than the unitary voltage by 5 V, the initial short circuit time value is 250 μs, subtracting 250 μs from the unitary value 500 μs (see dotted line N2 representing the welding current waveform in FIG. 5). In contrast, when the setting voltage is set to be +5 V of the unitary voltage, that is, when the setting voltage is set to be greater than the unitary voltage by 5 V, the initial short circuit time value is 750 μs, adding 250 μs to the unitary value 500 μs (see alternate long and short dash line N3 representing the welding current waveform in FIG. 5).

Although FIG. 7 shows the example of the absolute value method of ±50 μs per ±1 V, the variability method of ±10% per ±1 V can also be employed. Specifically, the initial short circuit time can also be changed by an absolute amount that corresponds to the difference between the optimal voltage and the setting voltage, or can be changed by an amount based on a change rate according to the difference between the optimal voltage and the setting voltage.

Further, in FIG. 7, the relation between the setting voltage and the initial short circuit time value is represented by a first order curve, but can be a curve other than the first order curve such as a quadratic curve, for example.

Here, as the setting voltage is set to be decreased from the unitary voltage, the number of short circuits increases and arc period A is reduced, and as a result, a droplet at a tip end of the welding wire becomes smaller. Accordingly, in the subsequent short circuit, the welding wire is hard to melt, and it is difficult to open the short circuit. However, by decreasing the initial short circuit time by carrying out the control according to this embodiment, the state in which the welding wire and the object to be welded are steadily short-circuited can be eased to some extent. With this, the melting of the welding wire can be accelerated, and it is possible to open the short circuit relatively smoothly.

As shown in FIG. 6 and FIG. 7, when the setting voltage is set to be a value increased or decreased from the unitary voltage, the initial short circuit current value from time P1 to time P2 and the initial short circuit time are changed according to this setting. At this time, as shown in FIG. 6 and FIG. 7, upper and lower limits can be set for the initial short circuit current value and the initial short circuit time, whereby it is possible to prevent excessive adjustment. Specifically, by setting the upper and lower limits, it is possible to prevent the initial short circuit current from being increased too much and the initial short circuit time from being decreased too much, thereby preventing a state in which the short circuit is opened immediately after the short circuit from occurring. Therefore, it is possible to prevent the cyclic nature of the short circuit from being upset.

It should be noted that the initial short circuit current value from time P1 to time P2 and the initial short circuit time are set based on, in addition to the difference value between the setting voltage and the unitary voltage, at least one of a diameter of the consumable electrode wire, a type of the wire thereof, an extension length of the wire thereof, a shielding gas to be supplied, and a current setting range of the welding current.

As described above, by controlling the initial short circuit current value and the initial short circuit time by carrying out the automatic adjustment based on the control method according to this embodiment, it is possible to melt the welding wire quickly after the generation of the short circuit. Therefore, even when the welding speed is set to be high and the setting voltage is set to be decreased from the unitary voltage, it is possible to prevent the wire flip from occurring and the arc from becoming instable.

If the welding speed is as low as under 1 m/min and the setting voltage is set to be increased from the unitary voltage, the initial short circuit current value from time P1 to time P2 is automatically adjusted to be decreased, and the initial short circuit time is automatically adjusted to be increased. Accordingly, it is possible to ensure a steadier short circuit condition. Therefore, it is possible to prevent the short circuit from being generated again immediately after the short circuit, thereby stabilizing the short circuit cycle.

Next, the welding apparatus that carries out the control according to this embodiment is described with reference to FIG. 8. Like components of the arc welding apparatus according to this embodiment that are denoted by the same numerals as those used for the arc apparatus embodiment 1 and will not be explained in detail. A main difference from the arc welding apparatus according to embodiment 1 is a structure of short circuit control unit 12.

Figure 8:
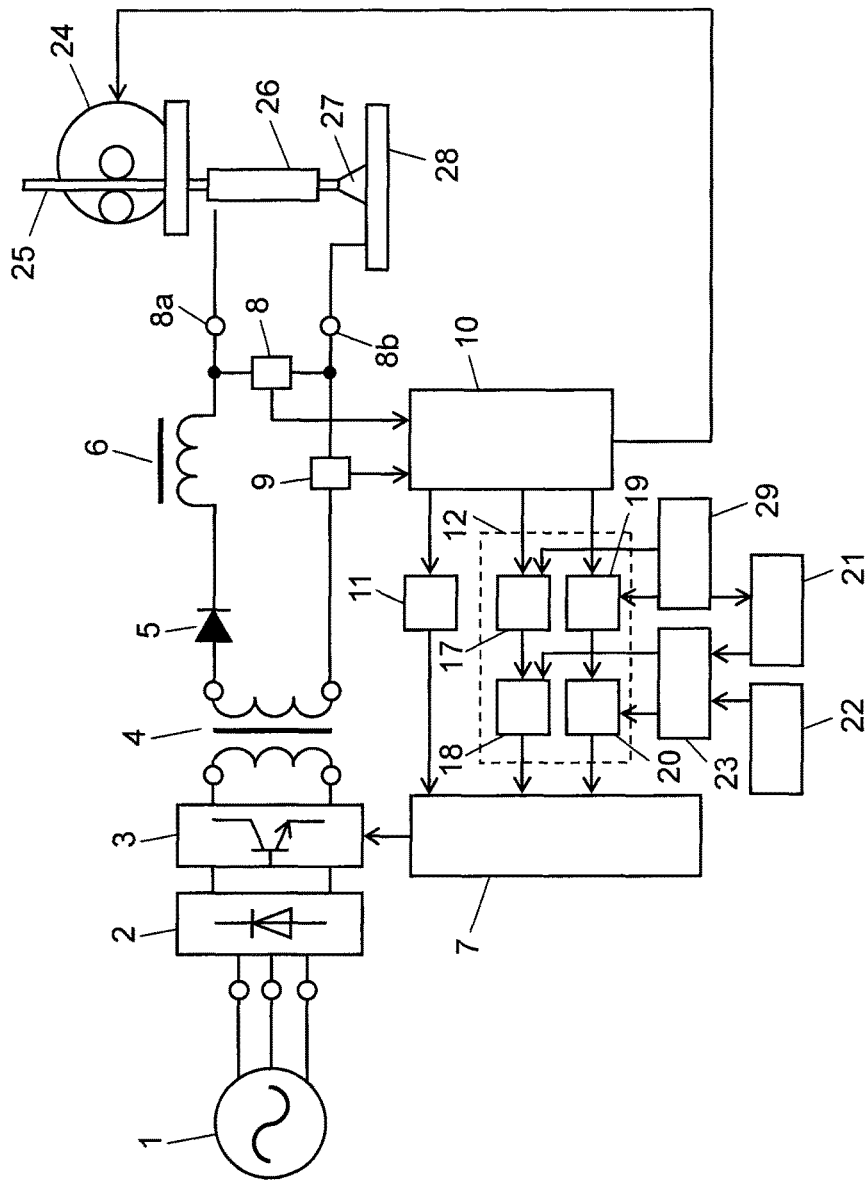
FIG. 8 is a schematic configurational view illustrating the arc welding apparatus according to embodiment 2.
Figure 9:
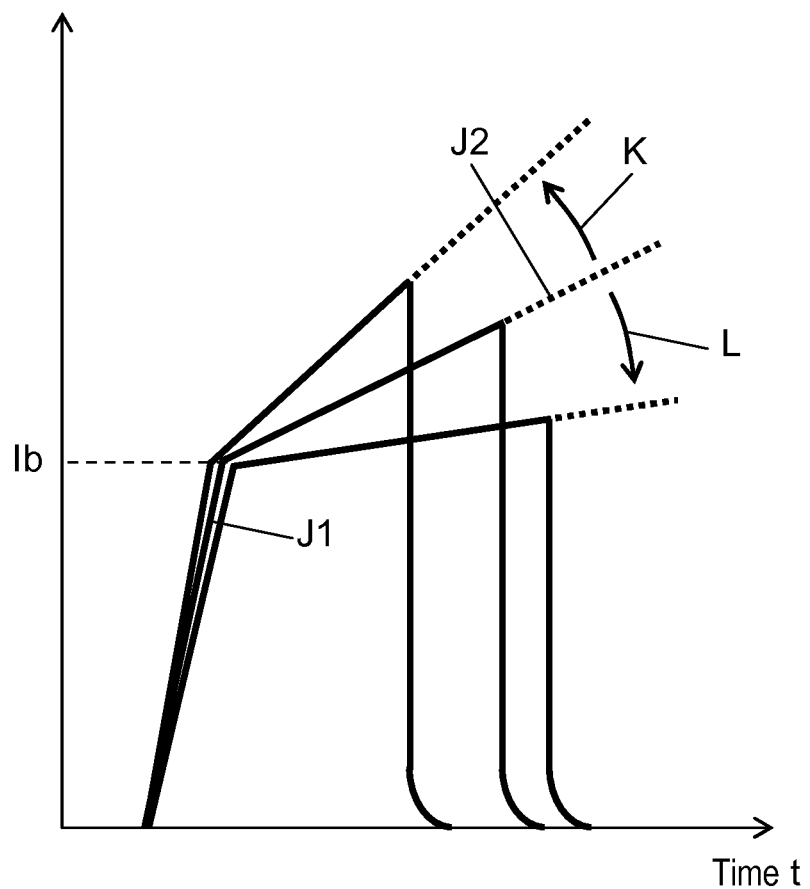
FIG. 9 is a chart showing one example of a welding current waveform in the conventional arc welding.

With reference to FIG. 8, short circuit control unit 12 is configured by basic setting unit 17 for the initial short circuit current that outputs a short circuit current, control unit 18 for initial short circuit current, basic setting unit 19 for initial short circuit time, and control unit 20 for initial short circuit time.

Welding voltage detecting unit 8 is connected between power output terminals for welding 8a, 8b, and outputs a signal that corresponds to the detected voltage to short circuit/arc detecting unit 10. Short circuit/arc detecting unit 10 determines whether an output welding voltage is equal to or greater than a predetermined value or smaller than the predetermined value based on the signal from welding voltage detecting unit 8, determines whether welding wire 25 is in contact with and short-circuited to object to be welded 28 or the welding arc is generated in a non-contact state based on the result of the determination, and outputs a determination signal.

Next, the short circuit control of short circuit/arc detecting unit 10 after the determination is described. Short circuit control unit 12 is provided with basic setting unit 17 for the initial short circuit current that sets, based on the setting current set by the operator, the initial short circuit current value that is a current supplied for a predetermined period of time from the start of the short circuit, and control unit 18 for the initial short circuit current that changes the initial short circuit current set by basic setting unit 17 for the initial short circuit current based on the result of the calculation by unitary/setting voltage difference calculation unit 23. Short circuit control unit 12 is further provided with basic setting unit 19 for the initial short circuit time that sets, based on the setting current set by the operator, the initial short circuit time that is a period of time during which the initial short circuit current value is supplied, and control unit 20 for the initial short circuit time that changes the initial short circuit time set by the basic setting unit for the initial short circuit time based on the result of the calculation by unitary/setting voltage difference calculation unit 23.

It should be noted that the relation between the setting current and each of the unitary voltage, the initial short circuit current, and the initial short circuit time are stored in a memory unit that is not shown in the drawing in a form such as a table or a mathematical expression, for example, and determined based on the setting current. Then, the difference between the unitary voltage of unitary voltage setting unit 21 and the setting voltage of setting voltage setting unit 22 is monitored by unitary/setting voltage difference calculation unit 23.

Short circuit control unit 12 receives the voltage difference value from unitary/setting voltage difference calculation unit 23, and controls the short circuit current as described with reference to FIG. 5 to FIG. 7. Specifically, control unit 18 for the initial short circuit current and control unit 20 for the initial short circuit time respectively change the values from basic setting unit 17 for the initial short circuit current and basic setting unit 19 for the initial short circuit time, and output the changed values to driving unit 7, thereby controlling the short circuit current.

With the arc welding apparatus described above, similarly to embodiment 1, it is possible to minimize problems such as a bead defect, a sputter increase, and a lack of penetration due to the arc unstability when the welding speed and the setting voltage is different from the unitary voltage by automatically adjusting the initial short circuit current value and the initial short circuit time. Therefore, it is possible to suppress harmful influences on a production efficiency and a work environment.

(Embodiment 3)

According to this embodiment, the control according to embodiment 1 and the control according to embodiment 2 are carried out in combination. Specifically, the control according to embodiment 1 shown in FIG. 1 of changing increasing slope di/dt in the first tier of the short circuit current from time P2 to time P3, increasing slope di/dt in the second tier of the short circuit current from time P3 to time P4, and the current value corresponding to inflection point B of the short circuit current at time P3, and the control according to embodiment 2 shown in FIG. 5 of changing the initial short circuit current from time P1 to time P2 and the initial short circuit time are combined. With this, even when the welding speed is set to be higher and the setting voltage is set to be decreased from the unitary voltage, it is possible to prevent the wire flip from occurring, and to stably carry out the welding, thereby further improving the welding speed and a tolerance of the lower limit of the voltage.

It should be noted that the structure of the arc welding apparatus according to this embodiment can be realized by combining the configuration included in short circuit control unit 12 shown in FIG. 4 and FIG. 8 of embodiment 1 and embodiment 2.

As described above, as compared to the case in which the control is carried out singly according to embodiment 1 or embodiment 2, according to this embodiment, it is possible to minimize problems such as a bead defect, a sputter increase, and a lack of penetration due to the arc instability generated when the welding speed is higher and the setting voltage is set to be smaller than the unitary voltage, thereby suppressing harmful influences on a production efficiency and a work environment.

As described above, the consumable electrode arc welding method according to the present invention includes: setting an optimal voltage and an increasing slope of a short circuit current to correspond to a setting current; feeding a consumable electrode wire; and alternately generating a short circuit condition and an arc condition, thereby carrying out welding, wherein when the setting voltage is different from the optimal voltage, the short circuit current is controlled by changing the increasing slope of the short circuit current according to a difference between the setting voltage and the optimal voltage.

Further, the consumable electrode arc welding method according to the present invention includes: setting an optimal voltage, an initial short circuit time that is a predetermined period of time from a start of a short circuit, and an initial short circuit current value that is a current supplied during the initial short circuit time to correspond to a setting current, feeding a consumable electrode wire; and alternately generating a short circuit condition and an arc condition, thereby carrying out welding, wherein when the setting voltage is different from the optimal voltage, the short circuit current is controlled by changing the initial short circuit current value and the initial short circuit time according to a difference between the setting voltage and the optimal voltage.

Moreover, a consumable electrode arc welding apparatus according to the present invention is an arc welding apparatus that carries out welding by repeating an arc condition and a short circuit condition between a welding wire as a consumable electrode and an object to be welded. The arc welding apparatus includes: a switching device for controlling a welding output; a welding voltage detecting unit for detecting a welding voltage; a short circuit/arc detecting unit for detecting either the short circuit condition or the arc condition based on an output from the welding voltage detecting unit; a short circuit control unit for controlling a short circuit current during a period of time of the short circuit condition in response to a short circuit signal from the short circuit/arc detecting unit; an arc control unit for controlling an arc voltage during a period of time of the arc condition in response to an arc signal from the short circuit/arc detecting unit; a driving unit for driving the switching device based on outputs from the short circuit control unit and the arc control unit; a setting current setting unit for setting a setting current; an optimal voltage setting unit for setting an optimal voltage based on the setting current that has been set by the setting current setting unit; a setting voltage setting unit for setting a setting voltage; and an optimal/setting voltage difference calculation unit for calculating a difference between the optimal voltage and the setting voltage. The short circuit control unit includes: a basic setting unit for an increasing slope for setting the increasing slope of the short circuit current based on the setting current that has been set by the setting current setting unit; and an increasing slope control unit for changing an increasing slope of the short circuit current that has been set by the increasing slope basic setting unit based on a result of the calculation by the optimal/setting voltage difference calculation unit.

Furthermore, a consumable electrode arc welding apparatus according to the present invention is an arc welding apparatus that carries out welding by repeating an arc condition and a short circuit condition between a welding wire as a consumable electrode and an object to be welded. The arc welding apparatus includes: a switching device for controlling a welding output; a welding voltage detecting unit for detecting a welding voltage; a short circuit/arc detecting unit for detecting either the short circuit condition or the arc condition based on an output from the welding voltage detecting unit; a short circuit control unit for controlling a short circuit current during a period of time of the short circuit condition in response to a short circuit signal from the short circuit/arc detecting unit; an arc control unit for controlling an arc voltage during a period of time of the arc condition in response to an arc signal from the short circuit/arc detecting unit; a driving unit for driving the switching device based on outputs from the short circuit control unit and the arc control unit; a setting current setting unit for setting a setting current; an optimal voltage setting unit for setting an optimal voltage based on the setting current that has been set by the setting current setting unit; a setting voltage setting unit for setting a setting voltage; and a optimal/setting voltage difference calculation unit for calculating a difference between the optimal voltage and the setting voltage. The short circuit control unit short circuit control unit includes: an initial short circuit current basic setting unit for setting the initial short circuit current value that is supplied during an initial short circuit time based on the setting current that has been set by the setting current setting unit, the initial short circuit time being a predetermined period of time from a start of a short circuit; an initial short circuit current control unit for changing the initial short circuit current value that has been set by the initial short circuit current basic setting unit based on a result of the calculation by the optimal/setting voltage difference calculation unit; an initial short circuit time basic setting unit for setting the initial short circuit time based on the setting current that has been set by the setting current setting unit; and an initial short circuit time control unit for changing the initial short circuit time that has been set by the initial short circuit time basic setting unit based on a result of the calculation by the optimal/setting voltage difference calculation unit. The short circuit control unit changes the initial short circuit current value and the initial short circuit time based on a result of the calculation by the optimal/setting voltage difference calculation unit.

According to the above configurations, it is possible to automatically adjust the increasing slope of the short circuit current, a current value at the inflection point of the short circuit current, the initial short circuit current, or the initial short circuit time without needing the welding operator even when a setting voltage is set to be smaller than a typical optimal voltage by a few V so as to address disturbances such as an increased welding speed, variations in a length of wire extension, and a gap between objects to be welded.

With this, by accelerating melting of the welding wire, it is possible to minimize problems such as a bead defect, a sputter increase, and a lack of penetration due to arc instability without causing the flip of the welding wire. Therefore, it is possible to improve the yield ratio of the objects to be welded and reduce the number of correction steps, thereby improving a welding quality in high speed welding. Further, it is possible to suppress harmful influences on a production efficiency and a work environment.

INDUSTRIAL APPLICABILITY

According to the present invention, it is possible to minimize problems such as a bead defect, a sputter increase, and a lack of penetration due to arc instability, and to suppress harmful influences on a production efficiency and a work environment. Therefore, the present invention can be applied to a wide range of industries where high speed welding is carried out to thin plates, for example, the automobile industry employing consumable electrode arc welding, and provides industrial applicability.

REFERENCE MARKS IN THE DRAWINGS

1 Input Power Source
2 Primary Rectifier
3 Switching Device
4 Transformer
5 Secondary Rectifier
6 Inductor
7 Driving Unit
8 Welding Voltage Detecting Unit
9 Welding Current Detecting Unit
10 Short Circuit/Arc Detecting Unit
11 Arc Control Unit
12 Short Circuit Control Unit
13 Basic Setting Unit for Increasing Slope di/dt of Short Circuit Current
14 Control Unit for Increasing Slope di/dt of Short Circuit Current
15 Basic Setting Unit for Inflection Point of Short Circuit Current
16 Control Unit for Inflection Point of Short Circuit Current
17 Basic Setting Unit for Initial Short Circuit Current
18 Control Unit for Initial Short Circuit Current
19 Basic Setting Unit for Initial Short Circuit Time
20 Control Unit for Initial Short Circuit Time
21 Unitary Voltage Setting Unit (Optimal Voltage Setting Unit)
22 Setting Voltage Setting Unit
23 Unitary/Setting Voltage Difference Calculation Unit (Optimal/Setting Voltage Difference Calculation Unit)
24 Wire Feeding Motor
25 Welding Wire
26 Chip
27 Welding Arc
28 Object to be Welded
29 Setting Current Setting Unit

The invention claimed is:

1. An arc welding method comprising:
   setting a set current;
   automatically setting an optimal voltage and a first current waveform having a portion that increases with a first constant slope of a short circuit current according to the set current;
   setting a set voltage, and when the set voltage is different from the optimal voltage;
   automatically changing the first current waveform having the portion that increases with the first constant slope of the short circuit current to a second current waveform having a portion that increases with a second constant slope of the short circuit current based on a difference between the optimal voltage and the set voltage; and
   starting welding with a consumable electrode by the set current, the set voltage and the second current waveform,
   wherein the setting step of the set current and the changing step of the first current waveform to the second current waveform are performed prior to the step of starting welding, and wherein
   when the set voltage is less than the optimal voltage, the second constant slope is steeper than the first constant slope, and
   when the set voltage is greater than the optimal voltage, the second constant slope is gentler than the first constant slope.

2. The arc welding method according to claim 1, wherein a difference of the first constant slope and the second constant slope corresponds to a difference of the optimal voltage and the set voltage.

3. The arc welding method according to claim 1, wherein a difference of the first constant slope and the second constant slope corresponds to a rate of the set voltage to the optimal voltage.

4. The arc welding method according to claim 1, wherein the first current waveform has a portion that increases with a third constant slope of the short circuit current which is consequent to the first constant slope of the short circuit current at a first inflection point, and
the second current waveform has a portion that increases with a fourth constant slope of the short circuit current which is consequent to the second constant slope of the short circuit current at a second inflection point.

5. The arc welding method according to claim 4, wherein when the set voltage is less than the optimal voltage, the fourth constant slope is steeper than the third constant slope, and
when the set voltage is greater than the optimal voltage, the fourth constant slope is gentler than the third constant slope.

6. The arc welding method according to claim 4, wherein the first constant slope is steeper than the third constant slope, and
the second constant slope is steeper than the fourth constant slope.

7. The arc welding method according to claim 4, wherein when the set voltage is less than the optimal voltage, the second inflection point is higher than the first inflection point, and
when the set voltage is greater than the optimal voltage, the second inflection point is lower than the first inflection point.

8. The arc welding method according to claim 7, wherein a difference of the first inflection point and the second inflection point corresponds to a difference of the optimal voltage and the set voltage.

9. The arc welding method according to claim 7, wherein a difference of the first inflection point and the second inflection point corresponds to a rate of the set voltage to the optimal voltage.

10. An arc welding method comprising:
setting a set current;
automatically setting an optimal voltage and a first current waveform having a first initial current of a short circuit current according to the set current;
setting a set voltage, and when the set voltage is different from the optimal voltage;
automatically changing the first current waveform having the first initial current of the short circuit current to a second current waveform having a second initial current of the short circuit current based on a difference between the optimal voltage and the set voltage; and
starting welding with a consumable electrode by the set current, the set voltage and the second current waveform,
wherein the setting step of the set current and the changing step of the first current waveform to the second current waveform are performed prior to the step of starting welding, and wherein
when the set voltage is less than the optimal voltage, the second initial current is larger than the first initial current, and
when the set voltage is greater than the optimal voltage, the second initial current is smaller than the first initial current.

11. The arc welding method according to claim 10, wherein
a difference of the first initial current and the second initial current corresponds to a difference of the optimal voltage and the set voltage.

12. The arc welding method according to claim 10, wherein
a difference of the first initial current and the second initial current corresponds to a rate of the set voltage to the optimal voltage.

13. The arc welding method according to claim 10, wherein
the first current waveform has a first initial time to keep the first initial current constant, and
the second current waveform has a second initial time to keep the second initial current constant.

14. The arc welding method according to claim 13, wherein
when the set voltage is less than the optimal voltage, the second initial time is shorter than the first initial time, and
when the set voltage is greater than the optimal voltage, the second initial time is longer than the first initial time.

15. The arc welding method according to claim 14, wherein
a difference of the first initial time and the second initial time corresponds to a difference of the optimal voltage and the set voltage.

16. The arc welding method according to claim 14, wherein
a difference of the first initial time and the second initial time corresponds to a rate of the set voltage to the optimal voltage.

* * * * *